US011819964B2

(12) United States Patent
Ogata et al.

(10) Patent No.: US 11,819,964 B2
(45) Date of Patent: Nov. 21, 2023

(54) NUT AND BOLT TIGHTENING METHOD AND TIGHTENING DEVICE

(71) Applicants: TOHNICHI MFG. CO., LTD., Tokyo (JP); SHIBAURA INSTITUTE OF TECHNOLOGY, Tokyo (JP)

(72) Inventors: Tomohiro Ogata, Tokyo (JP); Kyoichi Komatsu, Tokyo (JP); Seiji Ito, Tokyo (JP); Shinji Hashimura, Tokyo (JP)

(73) Assignees: TOHNICHI MFG.CO., LTD., Tokyo (JP); SHIBAURA INSTITUTE OF TECHNOLOGY, Tokyo (JP)

( * ) Notice: Subject to any disclaimer, the term of this patent is extended or adjusted under 35 U.S.C. 154(b) by 527 days.

(21) Appl. No.: 17/257,149

(22) PCT Filed: May 8, 2019

(86) PCT No.: PCT/JP2019/018435
§ 371 (c)(1),
(2) Date: Dec. 30, 2020

(87) PCT Pub. No.: WO2020/121548
PCT Pub. Date: Jun. 18, 2020

(65) Prior Publication Data
US 2021/0138594 A1 May 13, 2021

(30) Foreign Application Priority Data
Dec. 11, 2018 (JP) ................. 2018-231380

(51) Int. Cl.
*B23P 19/06* (2006.01)
*B25B 23/14* (2006.01)
(Continued)

(52) U.S. Cl.
CPC ............ *B23P 19/067* (2013.01); *B25B 23/14* (2013.01); *F16B 31/02* (2013.01); *F16B 31/04* (2013.01); *G01L 5/24* (2013.01); *B25B 29/02* (2013.01)

(58) Field of Classification Search
CPC ......... B23P 19/04; B23P 19/06; B23P 19/066; B23P 19/067; B23P 19/069; B25B 21/00;
(Continued)

(56) References Cited

U.S. PATENT DOCUMENTS 4,233,723 A * 11/1980 Eshghy .................. B25B 23/14
173/183
5,571,971 A * 11/1996 Chastel .................. B25B 23/14
73/761
(Continued)

FOREIGN PATENT DOCUMENTS

JP    H06-254774 A    9/1994
JP    H08-166299 A    6/1996
(Continued)

OTHER PUBLICATIONS

PCT/IB/338, "Notification of Transmittal of Translation of the International Preliminary Report on Patentability for International Application No. PCT/JP2019/018435," dated Jun. 24, 2021.
(Continued)

*Primary Examiner* — Robert J Scruggs
(74) *Attorney, Agent, or Firm* — Manabu Kanesaka

(57) ABSTRACT

Provided is a nut and a bolt tightening method for fastening an object, wherein a tightening force is applied on the object by rotating a nut or a bolt in a state in which a predetermined tension force is applied on the bolt in the axial direction of the bolt. When the tensile force exerted on the bolt decreases as the tightening force increases and after a timing when an inflection point occurs in a time course change in a ratio of an amount of change in the tensile force exerted on the bolt to an amount of change in an angle of rotation of the nut or the bolt, the tightening resulting from the rotation of the nut or bolt is terminated and the tensile force applied on the bolt is removed.

8 Claims, 11 Drawing Sheets

(51) Int. Cl.
  *F16B 31/02* (2006.01)
  *F16B 31/04* (2006.01)
  *G01L 5/24* (2006.01)
  *B25B 29/02* (2006.01)

(58) Field of Classification Search
  CPC ..... B25B 21/002; B25B 23/14; B25B 23/142; B25B 29/02; F16B 5/02; F16B 31/02; F16B 31/04; G01L 5/00; G01L 5/0033; G01L 5/24; Y10T 29/49766; Y10T 29/49767; Y10T 29/49863
  See application file for complete search history.

(56) References Cited

U.S. PATENT DOCUMENTS

| | | | | |
|---|---|---|---|---|
| 8,875,803 | B2* | 11/2014 | Galehr | B25B 23/14 173/183 |
| 10,850,376 | B2* | 12/2020 | Komatsu | B25B 29/02 |
| 2001/0037550 | A1* | 11/2001 | Shoberg | G01L 5/24 29/407.03 |

FOREIGN PATENT DOCUMENTS

| | | |
|---|---|---|
| JP | 2003-240655 A | 8/2003 |
| JP | 2004-101246 A | 4/2004 |
| JP | 2005-180508 A | 7/2005 |
| JP | 2008-095869 A | 4/2008 |
| JP | 4363661 B2 | 11/2009 |

OTHER PUBLICATIONS

PCT/IB/373, "International Preliminary Report on Patentability for International Application No. PCT/JP2019/018435," dated Jun. 8, 2021.

PCT/ISA/237, "Written Opinion of the International Searching Authority for International Application No. PCT/JP2019/018435," dated Jul. 16, 2019.

Taiwan Intellectual Property Office, "Office Action with Search Report for Taiwanese Patent Application 108116348," dated Sep. 7, 2022.

PCT/ISA/210, "International Search Report for International Application No. PCT/JP2019/018435," dated Jul. 16, 2019.

* cited by examiner

NUT AND BOLT TIGHTENING METHOD AND TIGHTENING DEVICE

RELATED APPLICATIONS

The present application is National Phase of International Application No. PCT/JP2019/018435 filed May 8, 2019, and claims priority from Japanese Application No. 2018-231380, filed Dec. 11, 2018, the disclosure of which is hereby incorporated by reference herein in its entirety.

TECHNICAL FIELD

The present invention relates to a tightening method and a tightening device capable of tightening a bolt and a nut with target tightening force.

BACKGROUND ART

In a tightening management method described in Patent Literature 1, a bolt and a nut are fastened to a fastening target object via three tightening steps until the force used to tighten the bolt and the nut is equal to target tightening force.

In the first tightening step, a front end portion of the bolt that is the portion protruding beyond the nut is pulled with predetermined tensile force with the upper surface of the nut pressed. The predetermined tensile force is equal to the target tightening force described above. At this point, the screw surface of the bolt is in contact with the screw surface of the nut in the contact position opposite the contact position where the bolt and the nut are in contact with each other when the bolt and the nut actually fasten the fastening target object.

In the second tightening step, the nut is rotated and tightened in the state in which the front end portion of the bolt is pulled with the predetermined tensile force. In this process, the nut is tightened until the tightening force becomes equal to the predetermined tensile force. At this point, the screw surface of the bolt and the screw surface of the nut are not in contact with each other due to backlash between the bolt and the nut.

In the third tightening step, the nut is further rotated and tightened. Tightening the nut as described above changes the state in which the tightening force is equal to the tensile force to a state in which the tightening force differs from the tensile force, and the rotation of the nut is terminated when the change occurs. In the state in which the tightening force differs from the tensile force, the tightening force increases, and the tensile force decreases. After the rotation of the nut is terminated, the tensile force exerted on the bolt is removed.

CITATION LIST

Patent Literature

Patent Literature 1: Japanese Patent No. 4,363,661

SUMMARY OF INVENTION

Technical Problem

The inventors of the present application have focused on the operation of fastening the bolt and the nut to the fastening target object and the timing when the tightening operation is terminated and found that the tightening force with which the bolt and the nut are tightened can be equal to the target tightening force. Although Patent Literature 1 also describes the timing when tightening operation is terminated, the inventors of the present application have found that the tightening force with which the bolt and the nut are tightened can be equal to the target tightening force even when the tightening operation is terminated at a timing different from the timing described in Patent Literature 1.

Solution to Problem

A first invention of the present application relates to a method for tightening a bolt and a nut that fasten a fastening target object. First, tightening force is exerted on the fastening target object by rotating the nut or the bolt in a state in which predetermined tensile force in an axial direction of the bolt is exerted on the bolt. The tightening resulting from the rotation of the nut or the bolt is terminated and the tensile force exerted on the bolt is removed when the tensile force exerted on the bolt decreases as the tightening force increases and after a timing when an inflection point occurs in a time course change in a ratio of an amount of change in the tensile force exerted on the bolt to an amount of change in an angle of rotation of the nut or the bolt.

The tightening resulting from the rotation of the nut or the bolt may be terminated and the tensile force exerted on the bolt may be removed when the ratio is roughly fixed in the time course change in the ratio. The predetermined tensile force may be equal to a target tightening force used to fasten the fastening target object.

A second invention of the present application relates to a tightening device that fastens a bolt and a nut to a fastening target object, and the tightening device includes a first sensor that detects tensile force exerted on the bolt in an axial direction thereof, a second sensor that detects an angle of rotation of the nut or the bolt, and a controller that controls the tightening resulting from the bolt and the nut. The controller, provided that tightening force is exerted on the fastening target object by rotating the nut or the bolt in a state in which predetermined tensile force is exerted on the bolt, terminates the tightening resulting from the rotation of the nut or the bolt when the tensile force exerted on the bolt decreases as the tightening force increases and after a timing when an inflection point occurs in a time course change in a ratio of an amount of change in the tensile force exerted on the bolt to an amount of change in an angle of rotation of the nut or the bolt. After the tightening resulting from the rotation of the nut or the bolt is terminated, the tensile force exerted on the bolt is removed.

The controller may terminate the tightening resulting from the rotation of the nut or the bolt when the ratio is substantially fixed in the time course change in the ratio. The predetermined tensile force may be equal to a target tightening force used to fasten the fastening target object.

Advantageous Effect of Invention

According to the present invention, the tightening force resulting from the bolt and the nut can be equal to the target tightening force.

EMBODIMENT

In a tightening method according to an embodiment of the present invention, by using a screw fastener that fastens a fastening target object with a bolt and a nut, the nut is tightened with predetermined tensile force exerted on the bolt in the axial direction of the bolt. Thereafter, the nut tightening operation is terminated, and the tensile force exerted on the bolt is removed at a predetermined timing described later, whereby the tightening force with which the bolt and the nut are tightened becomes equal to target tightening force.

(Screw Fastener and Tightening Device)

Figure 1:
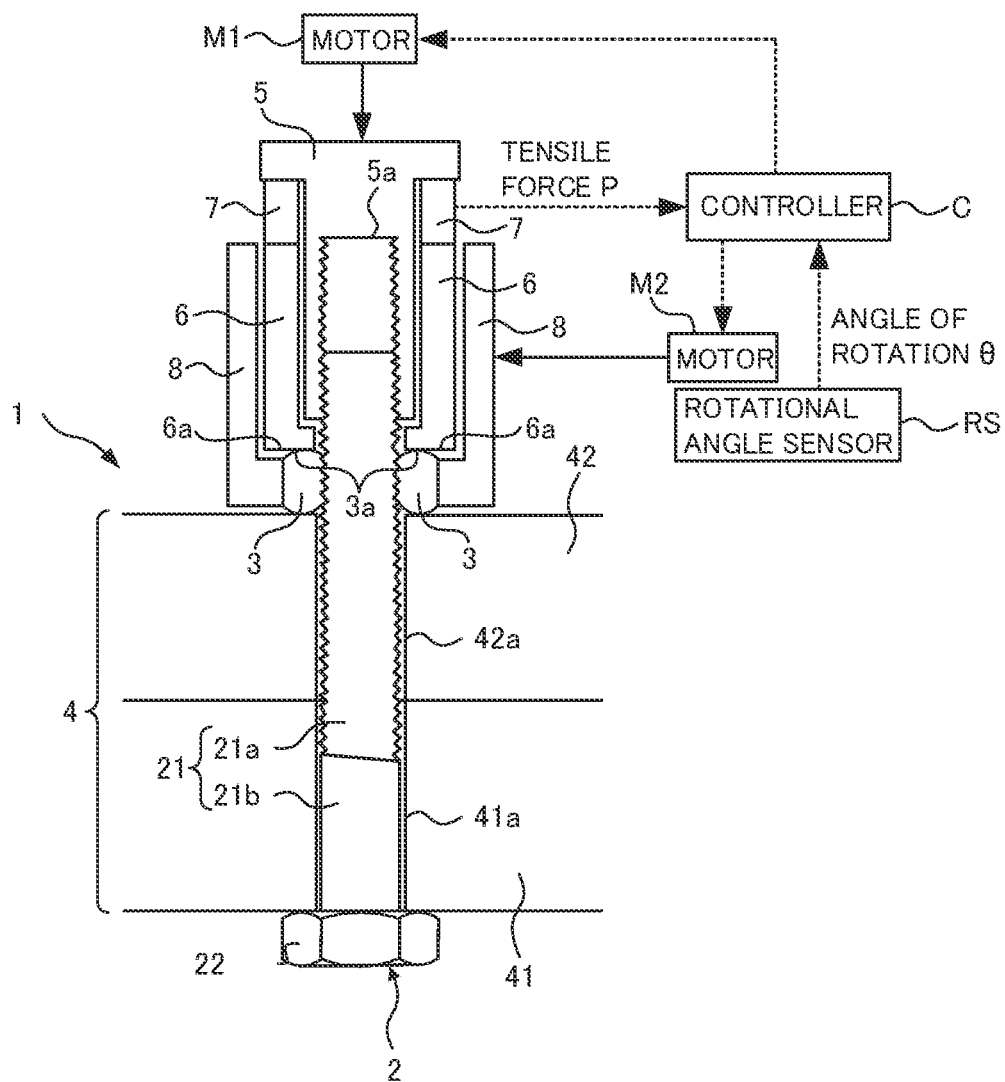
FIG. 1 shows the structure of a screw fastener and the configuration of a tightening device that tightens a bolt and a nut.

The structure of the screw fastener and the configuration of a tightening device that tightens the bolt and the nut will first be described with reference to FIG. 1. In FIG. 1, the solid-line (solid-straight-line) arrows mean mechanical connection, and the dotted-line (dotted-straight-line) arrows mean electrical connection.

A screw fastener 1 includes a bolt 2, a nut 3, and a fastening target object 4. The fastening target object 4 includes a first fastening target object 41 and a second fastening target object 42 superimposed on each other. The first fastening target object 41 and the second fastening target object 42 have through holes 41a and 42a formed therein, respectively, through which a shaft section 21 of the bolt 2 passes. The first fastening target object 41 and the second fastening target object 42 each have an arbitrary shape and are made of an arbitrary material, and the shapes and materials are determined as appropriate. In the present embodiment, the fastening target object 4 is formed of the first fastening target object 41 and the second fastening target object 42, but not necessarily. That is, the fastening target object 4 may be formed of the laminate of three or more fastening target objects.

The bolt 2 includes the shaft section 21 and a head section 22, and the shaft section 21 includes a screw section 21a, where a screw (external thread) is formed, and a cylindrical section 21b, where no screw is formed. The shaft section 21 may not include the cylindrical section 21b and may be formed only of the screw section 21a. The head section 22 of the bolt 2 is in contact with the lower surface of the first fastening target object 41. The front end of the screw section 21a of the bolt 2 protrudes upward beyond the upper surface of the second fastening target object 42, and a screw portion (internal thread) of the nut 3 engages with the protruding screw section 21a. When the nut 3 engages with the screw section 21a, the nut 3 and the head section 22 of the bolt 2 exert tightening force on the fastening target object 4.

The front end of the screw section 21a of the bolt 2 protrudes upward beyond an upper surface 3a of the nut 3, and a tension rod 5 is connected to the protruding screw section 21a. The tension rod 5 has a recess 5a, into which the screw section 21a is inserted, and a screw section that engages with the screw section 21a is formed on the inner circumferential surface of the recess 5a. Rotating the tension rod 5 in one direction allows the engagement between the screw section 21a and the screw section of the recess 5a to pull the screw section 21a (that is, bolt 2) upward.

A motor M1 is used as a power source for rotating the tension rod 5. For example, the tension rod 5 is connected to the motor M1 via a deceleration mechanism, and the power of the motor M1 can be transmitted to the tension rod 5. A controller C controls the operation of driving the motor M1. In place of the motor M1, the tension rod 5 can be rotated by an operator's manual operation.

A holder 6 is disposed outside the outer circumferential surface of the tension rod 5. A lower end surface 6a of the holder 6 comes into contact with the upper surface 3a of the nut 3. When the tension rod 5 pulls the bolt 2 upward, the holder 6 presses the nut 3. A load cell 7 (corresponding to first sensor in present invention) is disposed between the tension rod 5 and the holder 6 in the axial direction of the bolt 2 and used to detect force (tensile force) P [kN] with which the bolt 2 is pulled upward with the nut 3 pressed. Information on the tensile force P detected with the load cell 7 is transmitted to the controller C.

A drive socket 8 is disposed outside the outer circumferential surface of the holder 6, and a lower end portion of the drive socket 8 engages with the outer side surface of the nut 3. Rotating the drive socket 8 in one direction allows the nut 3 to rotate and move in the direction in which the fastening target object 4 is fastened (downward direction). Rotating the drive socket 8 in the other direction allows the nut 3 to rotate and move in the direction in which the fastening target object 4 is not fastened (upward direction).

A motor M2 is used as a drive source for rotating the drive socket 8. For example, the drive socket 8 is connected to the motor M2 via a deceleration mechanism, and the power of the motor M2 can be transmitted to the drive socket 8. The motor M2 is provided with a rotational angle sensor RS (corresponding to second sensor in present invention). The rotational angle sensor RS is used to detect the angle of rotation θ [deg] of the nut 3 in a predetermined cycle, and information on the angle of rotation θ detected with the rotational angle sensor RS is transmitted to the controller C. The controller C controls the operation of driving the motor M2.

(Tightening Method)

A method for fastening the bolt 2 and the nut 3 to the fastening target object 4 will next be described. The tightening method includes a first step, a second step, a third step, and a fourth step, and the tightening method allows tightening force F with which the bolt 2 and the nut 3 are tightened to be equal to tightening force to be targeted (hereinafter referred to as target tightening force) Ftag.

Figure 2:
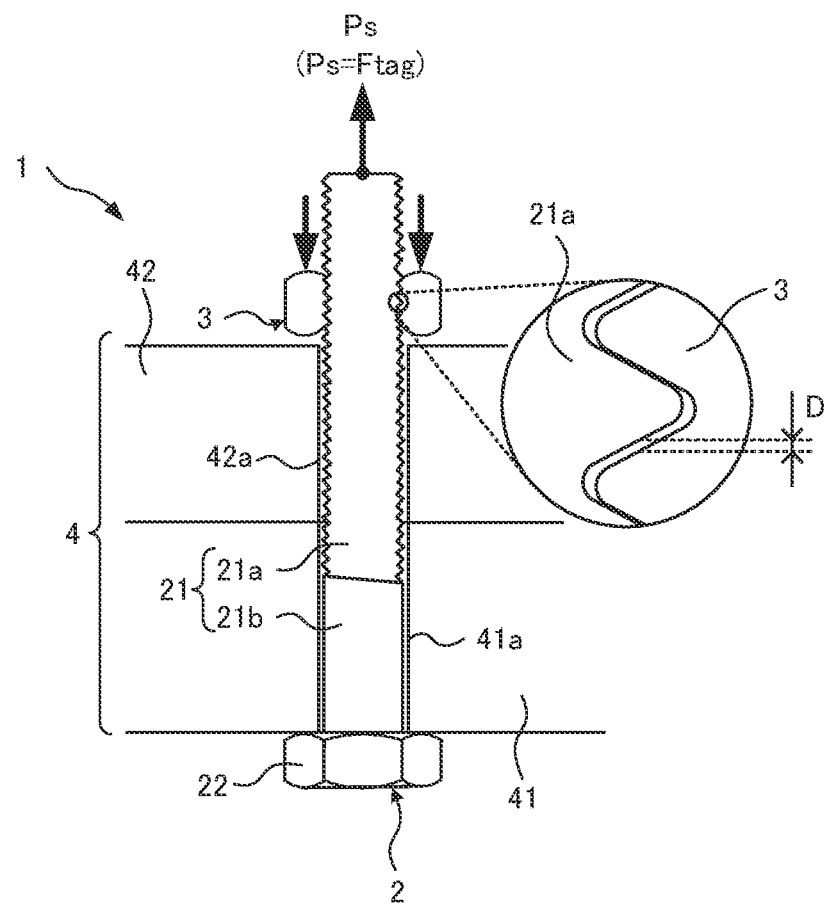
FIG. 2 shows the state of the screw fastener in a first step.

In the first step, in a state in which the nut 3 is separate from the upper surface of the second fastening target object 42, the tension rod 5 is rotated with the lower end surface 6a of the holder 6 pressed against the upper surface 3a of the nut 3 to pull the bolt 2 upward. FIG. 2 shows the force exerted on each of the bolt 2 and the nut 3 in the form of an arrows (straight line). The direction of each of the arrows shown in FIG. 2 represents the direction in which the corresponding force is exerted.

Tensile force Ps can be so set as to be equal to the target tightening force Ftag used to fasten the fastening target object 4 with the bolt 2 and the nut 3. The controller C can grasp the tensile force P based on the output from the load cell 7 and controls the rotation of the tension rod 5 to achieve the state in which the tensile force P is equal to the tensile force Ps (target tightening force Ftag).

When the tensile force P reaches the tensile force Ps (target tightening force Ftag), the state in which the threads of the screw section 21a are in contact with the threads of the nut 3 is the state shown in the enlarged inset in FIG. 2. In this state, the upper surfaces of the threads of the screw section 21a are in contact with the lower surfaces of the threads of the nut 3, which is opposite the state achieved when the fastening target object 4 is actually fastened with the bolt 2 and the nut 3 (state shown in the enlarged inset in FIG. 4, which will be described later). Backlash corresponding to a distance D in the axial direction of the bolt 2 occurs in the portions where the threads of the screw section 21a are not in contact with the threads of the nut 3.

Figure 3:
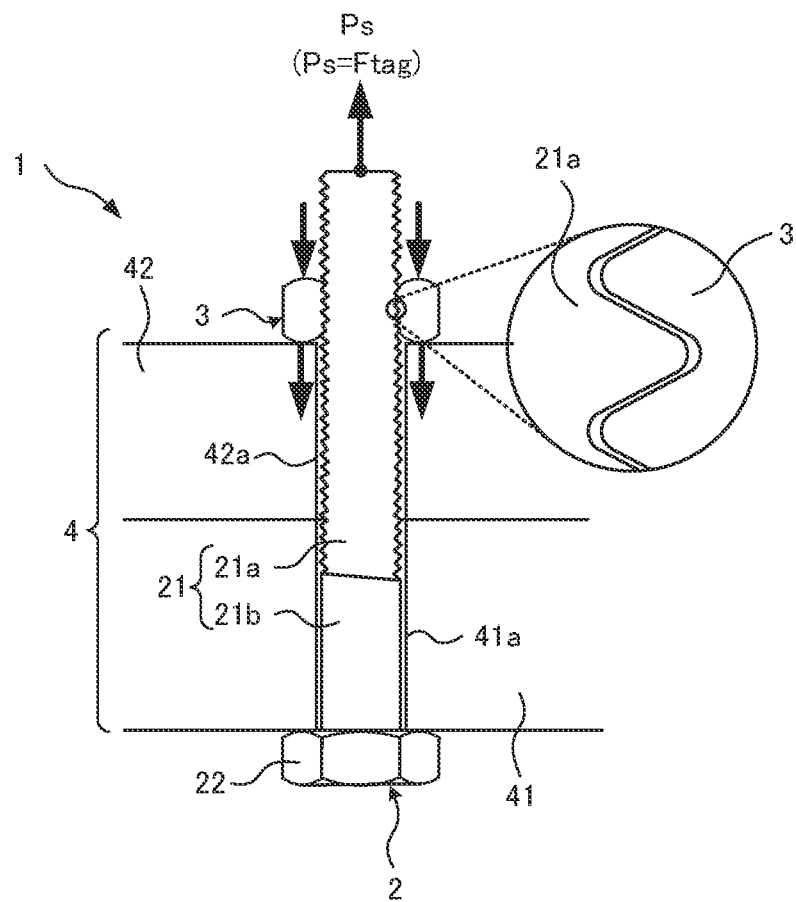
FIG. 3 shows the state of the screw fastener in a second step.

In the second step, the drive socket 8 rotates and tighten the nut 3 with the tensile force P exerted on the bolt 2 maintained equal to the tensile force Ps. FIG. 3 shows force exerted on each of the bolt 2, the nut 3, and the fastening target object 4 in the form of an arrow (straight line). The direction of each of the arrows shown in FIG. 3 represents the direction in which the corresponding force is exerted.

In the configuration shown in FIG. 1, when only the drive socket 8 is rotated, the nut 3 moves in the direction in which the nut 3 moves away from the lower end surface 6a of the holder 6 (downward direction), and the tensile force P undesirably becomes smaller than the tensile force Ps. To avoid such a state, the tension rod 5 is so rotated that the holder 6 follows the downward movement of the nut 3 resulting from the operation of tightening of the nut 3, whereby the nut 3 can be rotated and tightened with the tensile force P maintained equal to the tensile force Ps. Specifically, the rotation of the tension rod 5 only needs to synchronize with the rotation of the drive socket 8.

After the nut 3 comes into contact with the upper surface of the second fastening target object 42, the tightening operation resulting from the rotation of the nut 3 increases the tightening force F exerted by the bolt 2 and the nut 3. Thereafter, when the state in which the threads of the screw section 21a are in contact with the threads of the nut 3 becomes the state shown in the enlarged inset in FIG. 3, the tensile force P abruptly increases. In the state shown in the enlarged inset in FIG. 3, the threads of the screw section 21a are separate from the threads of the nut 3 due to the backlash between the bolt 2 and the nut 3 (distance D shown in FIG. 2).

When it is determined that the tensile force P has abruptly increased, the second step can be terminated. Specifically, it can be determined based on a change rate $dP/d\theta$, which will be described below, that the tensile force P has abruptly increased.

The change rate $dP/d\theta$ [kN/deg] is the ratio of the amount of change dP [kN] in the tensile force P to the amount of change $d\theta$ [deg] in the angle of rotation $\theta$ of the nut 3. In other words, the change rate $dP/d\theta$ is the differential value of the behavior of the tensile force P with respect to the angle of rotation $\theta$ in the coordinate system having coordinate axes representing the angle of rotation $\theta$ and the tensile force P. Calculating the amount of change $d\theta$ and the amount of change dP allows calculation of the change rate $dP/d\theta$, as will be described below.

Since the rotational angle sensor RS detects the angle of rotation $\theta$ in the predetermined cycle, the amount of change $d\theta$ is calculated based on an angle of rotation $\theta p$ detected at the preceding detection timing and an angle of rotation $\theta c$ detected at the current detection timing. That is, the amount of change $d\theta$ is the result of subtraction of the angle of rotation $\theta p$ from the angle of rotation $\theta c$. The load cell 7 detects the tensile force P in the predetermined cycle, and the amount of change dP is therefore calculated based on tensile force Pp detected at the preceding detection timing and tensile force Pc detected at the current detection timing. That is, the amount of change dP is the result of subtraction of the tensile force Pp from the tensile force Pc.

To determine that the tensile force P has abruptly increased, it may be determined that the change rate $dP/d\theta$ is greater than a predetermined change rate $dP/d\theta\_th$. The predetermined change rate $dP/d\theta\_th$ can be determined in advance in consideration of the specific structure and material of the screw fastener 1 and can, for example, be 0.15 [kN/deg].

Figure 4:
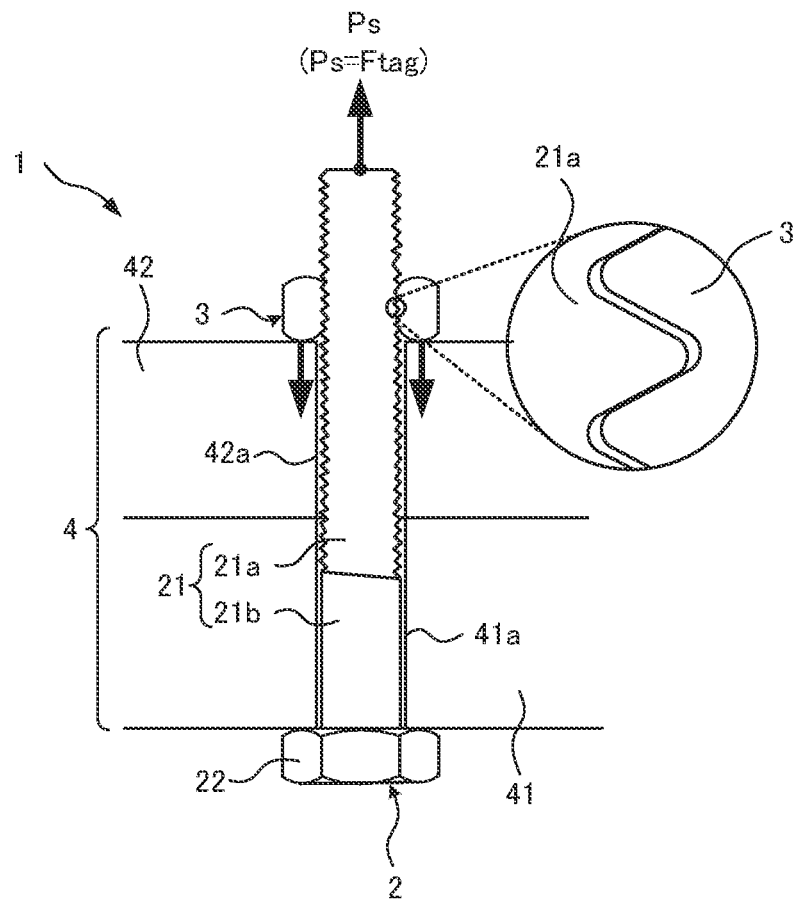
FIG. 4 shows the state of the screw fastener in a third step.

In the third step, from the state in which the second step is completed (state shown in enlarged inset of FIG. 3), the nut 3 is further rotated in the tightening direction to achieve the properly tightened state of the bolt 2 and the nut 3. In the description, the tension rod 5 is not rotated, and only the drive socket 8 is rotated. FIG. 4 shows the force exerted on each of the bolt 2, the nut 3, and the fastening target object 4 in the form of an arrow (straight line). The direction of each of the arrows shown in FIG. 4 represents the direction in which the corresponding force is exerted.

In the state shown in FIG. 4, the lower surfaces of the threads of the screw section 21a are in contact with the upper surfaces of the threads of the nut 3, which is the state achieved when the fastening target object 4 is actually fastened with the bolt 2 and the nut 3. The third step is completed by stopping the rotation of the nut 3 at a timing described later.

In the third step, the timing when the rotation of the nut 3 is stopped is determined based on the change rate $dP/d\theta$ described above. In the third step, the tightening resulting from the rotation of the nut 3 increases the tightening force F, the tensile force P decreases by the amount corresponding to the increase in the tightening force F. Since the tensile force Pc described above becomes smaller than the tensile force Pp at this point, the amount of change dP (dP=Pc−Pp) has a negative value. Further, since the amount of change $d\theta$ has a positive value, the change rate $dP/d\theta$ has a negative value.

As for the behavior (time course change) of the change rate $dP/d\theta$ described above, the change rate $dP/d\theta$ keeps decreasing and is then unlikely to change. Specifically, the change rate $dP/d\theta$ abruptly decreases due to the elastic deformation of the threads of the bolt 2 and the threads of the nut 3, and the change rate $dP/d\theta$ is unlikely to change near the elastic limit. The behavior of the change rate $dP/d\theta$ therefore has an inflection point. The inflection point is located at the boundary between the time frame for which the change rate $dP/d\theta$ keeps decreasing and the time frame for which the change rate $dP/d\theta$ is unlikely to change in the coordinate system having coordinate axes representing the change rate $dP/d\theta$ and the time.

In the present embodiment, the rotation of the nut 3 is stopped after the timing when the inflection point occurs in the behavior of the change rate $dP/d\theta$. Specifically, the controller C identifies the timing when the inflection point occurs in the behavior of the change rate $dP/d\theta$ while calculating the change rate $dP/d\theta$ as described above. After the timing when the inflection point occurs, the controller C stops the rotation of the nut 3 by stopping the operation of driving the motor M2.

The timing when the rotation of the nut 3 is stopped may be the timing when the inflection point occurs or a timing after the timing when the inflection point occurs. The timing after the timing when the inflection point occurs can be determined as appropriate. For example, the timing can be a timing when a period determined in advance elapses after the timing when the inflection point occurs. It is, however, noted that when the nut 3 is rotated excessively after the inflection point occurs, the threads of the bolt 2 and the threads of the nut 3 are plastically deformed, and the upper limit of the predetermined period described above can be determined in consideration of this point.

The occurrence of an inflection point in the behavior of the change rate $dP/d\theta$ can, for example, be identified as follows: After the change rate $dP/d\theta$ decreases, and when it is determined that the change rate $dP/d\theta$ is substantially fixed for a predetermined period, an inflection point has occurred in the behavior of the change rate $dP/\theta$. The output from each of the rotational angle sensor RS and the load cell 7 contains noise in some cases, and the noise causes slight variation (increase or decrease) in the change rate $dP/d\theta$. In consideration of this point, known smoothing (what is called blunting) can be performed on the change rate $dP/d\theta$ to remove the above-mentioned effect of the noise, and whether or not the change rate $dP/d\theta$ is fixed can then be determined. On the other hand, a range within which the variation (increases or decreases) in the change rate $dP/d\theta$ due to the noise described above is allowed (allowable range) is determined in advance, and when the change rate $dP/d\theta$ keeps varying (increasing or decreasing) within the allowable range, it can be determined that the change rate $dP/d\theta$ is fixed.

Figure 5:
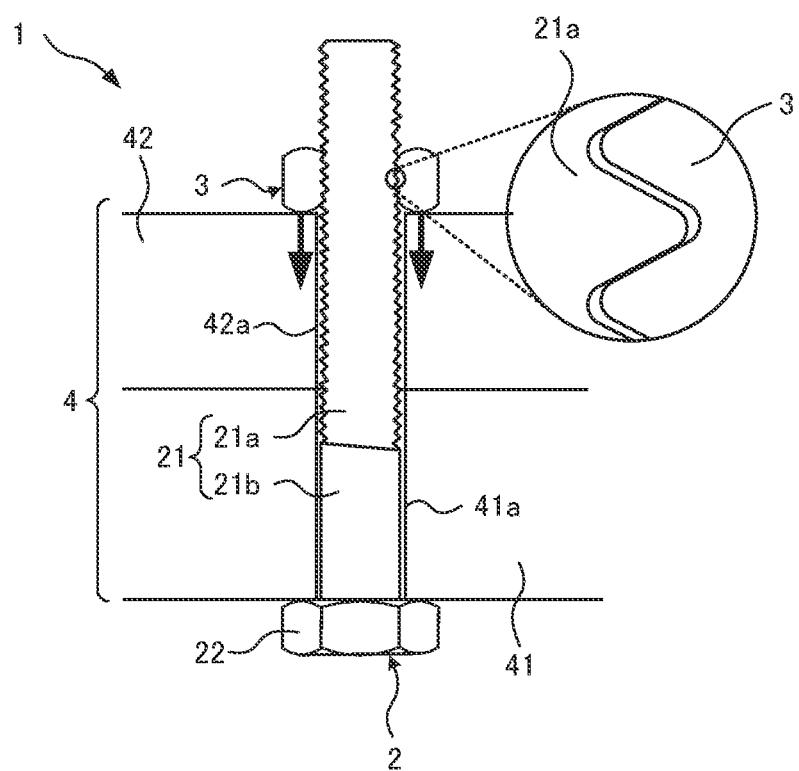
FIG. 5 shows the state of the screw fastener in a fourth step.

In the fourth step, the tensile force Ps exerted on the bolt 2 is removed. The tension rod 6 is removed from the shaft section 21 of the bolt 2, and the drive socket 8 is removed from the nut 3. FIG. 5 shows the force exerted on each of the bolt 2, the nut 3, and the fastening target object 4 in the form of an arrow (straight line). The direction of each of the arrows shown in FIG. 5 represents the direction in which the corresponding force is exerted. In the state shown in FIG. 5, the lower surfaces of the threads of the screw section 21a are in contact with the upper surfaces of the threads of the nut 3, which is the state achieved when the fastening target object 4 is actually fastened with the bolt 2 and the nut 3.

In the fourth step, the tensile force P decreases to 0 [kN], and the tightening force F becomes equal to the target tightening force Ftag. The fourth step, that is, the method for tightening the bolt 2 and the nut 3 is thus completed.

Figure 6:
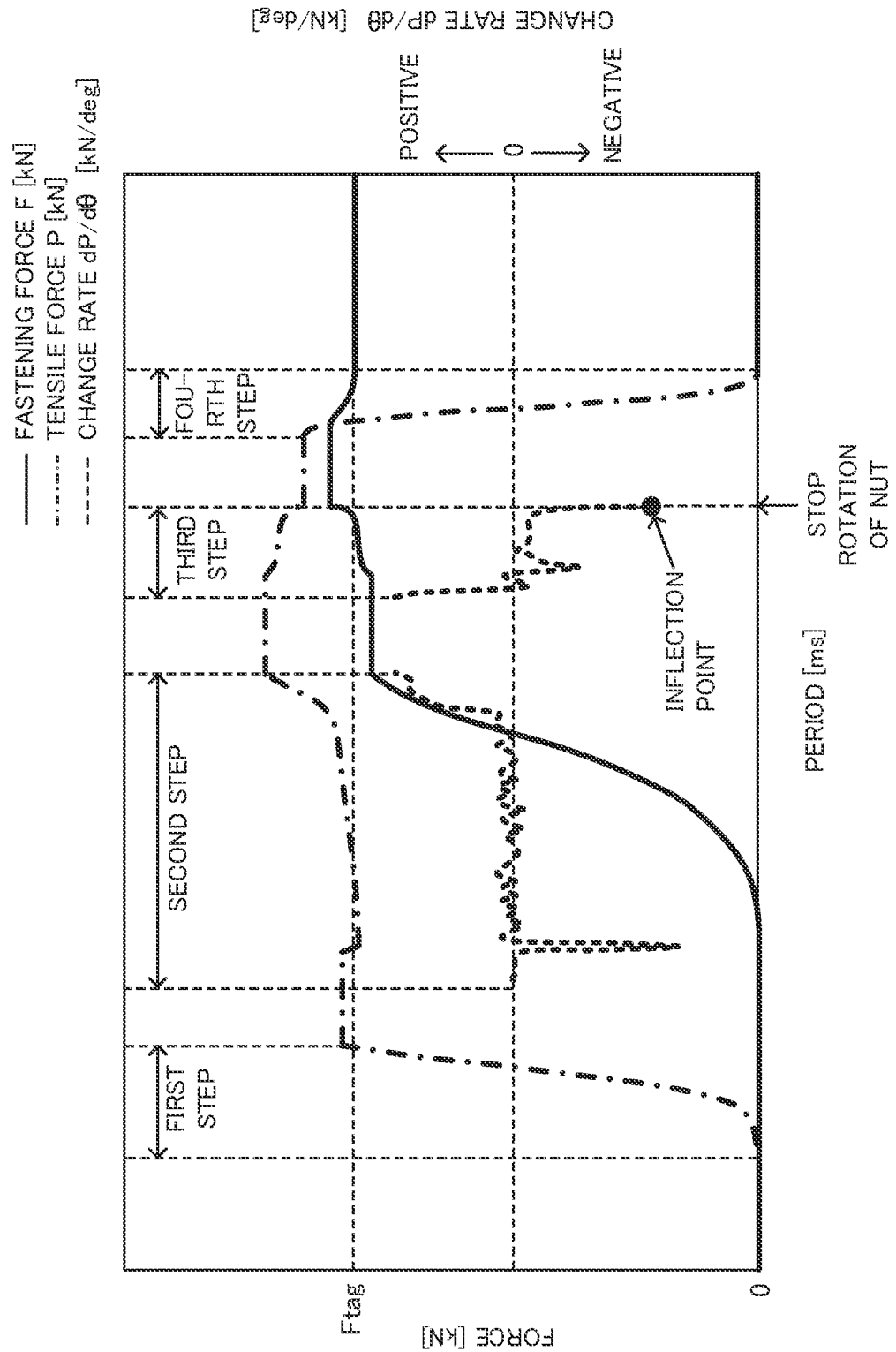
FIG. 6 shows time course changes in tightening force and tensile force and a time course change in a change rate dP/dθ in an embodiment of the present invention.

FIG. 6 shows time course changes in the tightening force F and the tensile force P and a time course change in the change rate $dP/d\theta$. In FIG. 6, the horizontal axis represents the period [ms] for which the first step, the second step, the third step, and the fourth step described above are carried out. The time frame excluding the period for which the first step, the second step, the third step, and the fourth step are carried out is a no-action time frame. The left vertical axis in FIG. 5 represents the force (tightening force F or tensile force P) [kN], and the right vertical axis in FIG. 5 represents the change rate $dP/d\theta$ [kN/deg]. The behavior of the change rate $dP/\theta$ is shown only in the second step and the third step for convenience of the computation of the change rate $dP/d\theta$.

The tightening force F shown in FIG. 6 shows values detected with a load cell (not shown) incorporated in the fastening target object 4. When the bolt 2 and the nut 3 are actually fastened to the fastening target object 4, no load cell is provided, and the tightening force F is not measured. The tensile force P shows values detected with the load cell 7, and the change rate $dP/d\theta$ shows values calculated based on the tensile force P and the angle of rotation $\theta$ detected with the rotational angle sensor RS.

In the first step, the tensile force P increases to the tensile force Ps (target tightening force Ftag), as shown in FIG. 6. At this point, since the nut 3 is separate from the upper surface of the second fastening target object 42, the tightening force F remains at 0 [kN]. In the second step, the nut 3 is rotated and tightened with the tensile force P maintained at the tensile force Ps (target tightening force Ftag). The tightening force F increases accordingly. When the tensile force P abruptly increases, that is, when the threads of the bolt 2 and the threads of the nut 3 are elastically deformed, the tightening resulting from the rotation of the nut 3 is terminated.

In the third step, the tightening force F increases, and the tensile force P decreases. As for the behavior of the change rate $dP/d\theta$, the change rate $dP/d\theta$ has a negative value, and an inflection point occurs. When it is determined that the inflection point has occurred, the rotation of the nut 3 is stopped. In the fourth step, the tensile force P exerted on the bolt 2 is removed and therefore decreases to 0 [kN]. When the tensile force P exerted on the bolt 2 is removed, the tightening force F decreases and then becomes equal to the target tightening force Ftag. After the tensile force P exerted on the bolt 2 is removed, the elastically deformed threads of the bolt 2 and the nut 3 are restored, and the tightening force F decreases accordingly.

As described above, in the present embodiment, which focuses on the change rate $dP/d\theta$, the tightening force F can be equal to the target tightening force Ftag by stopping the rotation of the nut 3 after the timing when an infection point occurs in the behavior of the change rate $dP/d\theta$ to remove the tensile force P.

In the present embodiment, the lower end surface 6a of the holder 6 is in contact with the upper surface 3a of the nut 3, but not necessarily, and any configuration that allows the nut 3 to be pressed may be employed. For example, the nut 3 may be pressed with another member interposed between the holder 6 and the nut 3.

Figure 7:
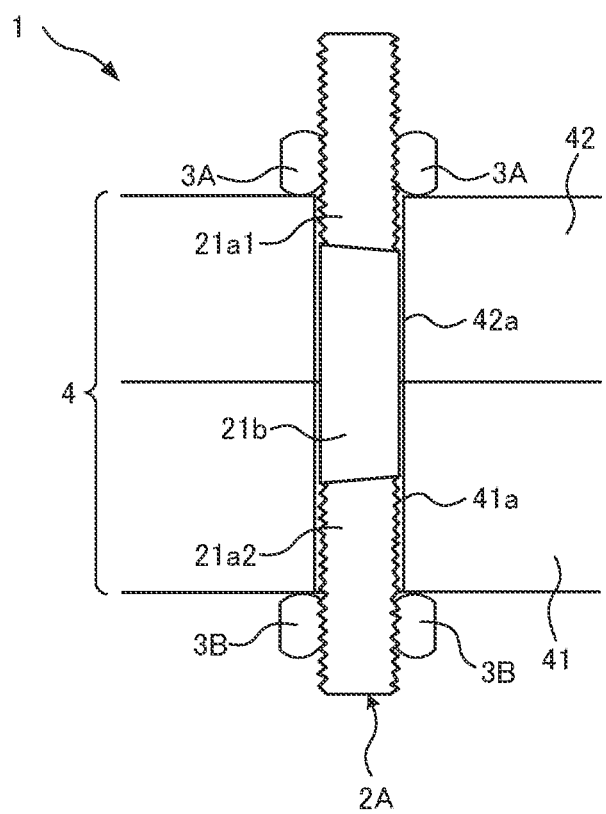
FIG. 7 shows the structure of a screw fastener using a stud bolt.
Figure 8:
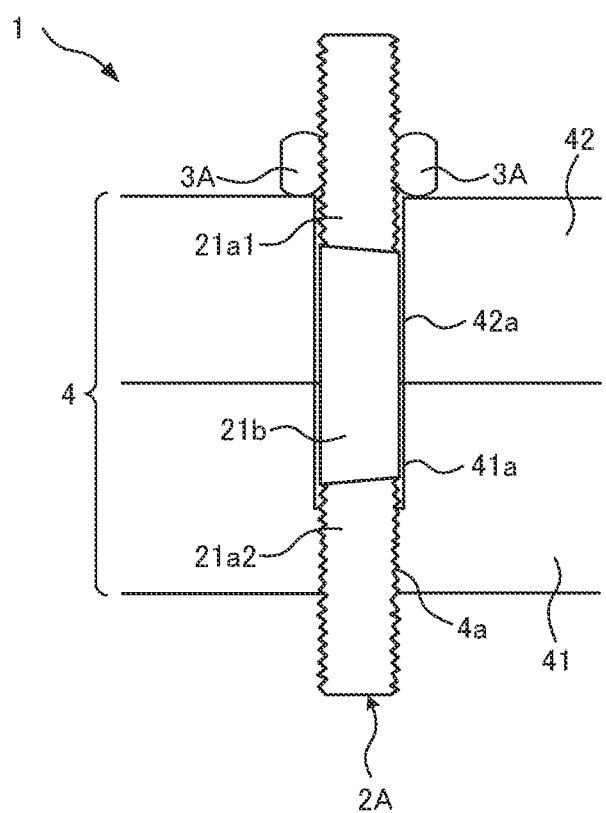
FIG. 8 shows the structure of another screw fastener using the stud bolt.

In the present embodiment, the bolt 2 including the head section 22 is used, and the bolt 2 can be replaced, for example, with a stud bolt 2A shown in FIGS. 7 and 8. The stud bolt 2A shown in FIGS. 7 and 8 includes two screw sections 21a1 and 21a2 and a cylindrical section 21b formed between the two screw sections 21a1 and 21a2. The stud bolt 2A may not include the cylindrical section 21b. In FIGS. 7 and 8, the same members as those described with reference to FIG. 1 have the same reference characters.

In the configuration shown in FIG. 7, nuts 3A and 3B are allowed to engage with the screw sections 21a1 and 21a2 formed at the opposite ends of the stud bolt 2A, respectively, and the two nuts 3A and 3B can sandwich the fastening target object 4. In the configuration shown in FIG. 8, the nut 3A is allowed to engage with the screw section 21a1 formed at one end of the stud bolt 2A, and the screw section 21a2 formed at the other end of the stud bolt is allowed to engage with a screw section 4a formed in a through hole (corresponding to through hole 41a) in the fastening target object 4.

In the configurations shown in FIGS. 7 and 8, the holder 6 shown in FIG. 1 can be used to press the nut 3A, and the tension rod 5 shown in FIG. 1 can be used to pull the screw section 21a1 protruding beyond the nut 3A to generate the tensile force P. Further, the drive socket 8 shown in FIG. 1 can be used to rotate and tighten the nut 3A.

In FIGS. 7 and 8, the screw sections 21a1 and 21a2 have the same outer diameter (nominal diameter). The screw sections 21a1 and 21a2 may instead have different outer diameters. Specifically, the outer diameter of the screw section 21a1 may be greater than the outer diameter of the screw section 21a2, or the outer diameter of the screw section 21a1 may be smaller than the outer diameter of the screw section 21a2.

On the other hand, the present invention is applicable as long as the tensile force P can be exerted on the bolt 2, and the configuration in which the tensile force P is exerted on the bolt 2 is not limited to the configuration shown in FIG. 1.

(Variations)

In a tightening method according to a variation of the present invention, the screw fastener 1, which fastens the fastening target object 4 by using the bolt 2 and the nut 3, is so configured that the bolt 2 is tightened with predetermined tensile force in the axial direction of the bolt 2 exerted on the bolt 2. The operation of tightening the bolt 2 is then terminated at a predetermined timing that will be described later to remove the tensile force exerted on the bolt 2, whereby the tightening force F resulting from the bolt 2 and the nut 3 becomes equal to the target tightening force Ftag.

Figure 9:
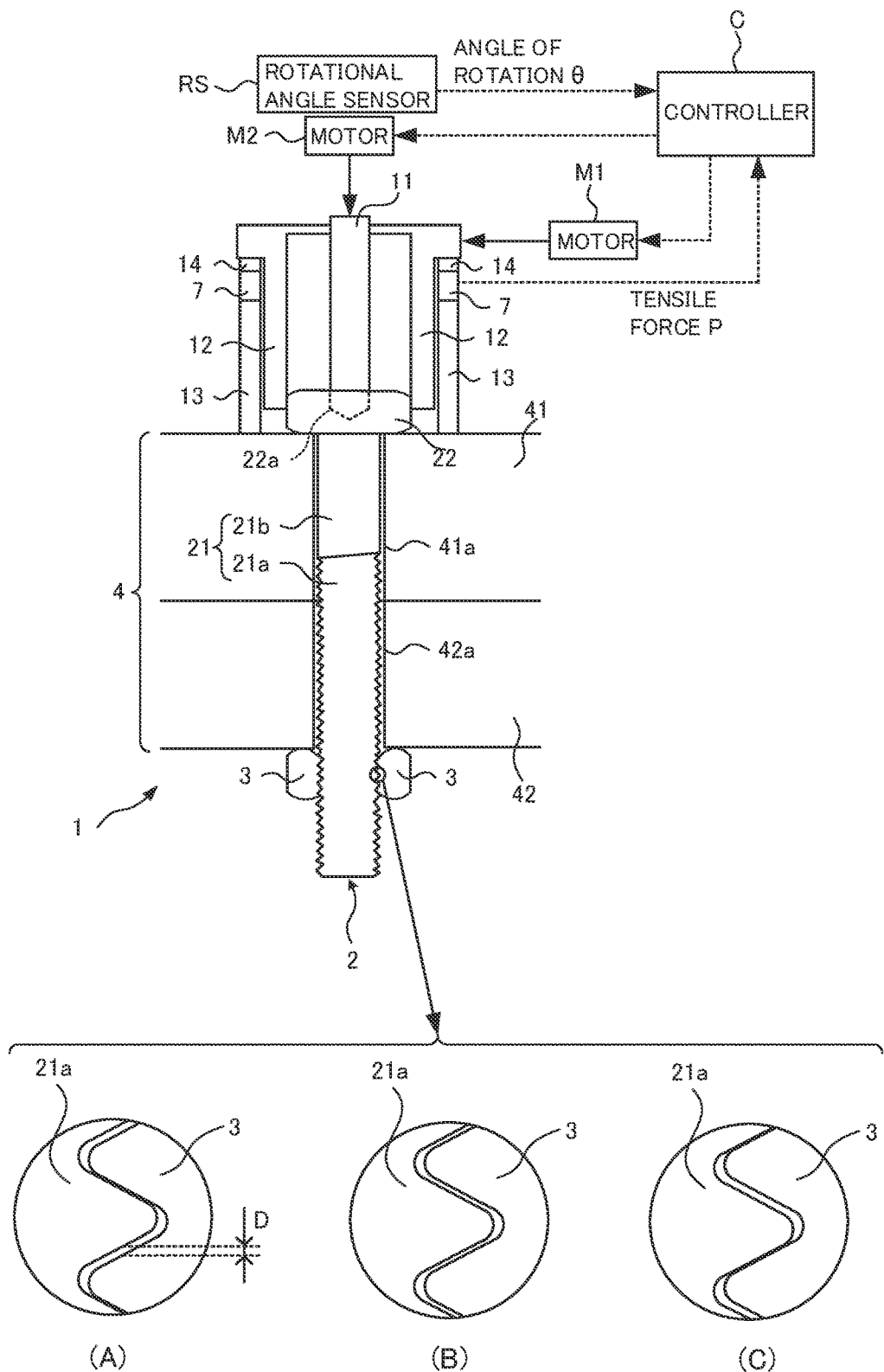
FIG. 9 shows the structure of a screw fastener and the configuration of a tightening device that tightens a bolt and a nut in a variation.

Another configuration (variation) in which the tensile force P is exerted on the bolt 2 will be described below with reference to FIG. 9. In FIG. 9, the solid-line (solid-straight-line) arrows mean mechanical connection, and the dotted-line (dotted-straight-line) arrows mean electrical connection. In FIG. 9, the same members as those described with reference to FIG. 1 have the same reference characters. Configurations different from those shown in FIG. 1 will be primarily described below.

A bit hole 22a is formed via the upper surface of the head section 22 of the bolt 2, and a front end portion of a bit 11 engages with the bit hole 22a. Rotating the bit 11 in one direction allows the bolt 2 to rotate in the direction in which the fastening target object 4 is fastened. Rotating the bit 11 in the other direction allows the bolt 2 to rotate in the direction in which the fastening target object 4 is not fastened.

The motor M2 is used as a drive source for rotating the bit 11. For example, the bit 11 is connected to the motor M2 via a deceleration mechanism, and the power of the motor M2 can be transmitted to the bit 11. The motor M2 is provided with the rotational angle sensor RS. The rotational angle sensor RS is used to detect the angle of rotation θ of the bolt 2 in a predetermined cycle, and information on the angle of rotation θ detected with the rotational angle sensor RS is transmitted to the controller C. The controller C controls the operation of driving the motor M2.

A tension rod 12 is disposed outside the outer circumferential surface of the bit 11, and a lower end portion of the tension rod 12 is engageable with the head section 22 of the bolt 2. Specifically, a screw section is formed on the outer side surface of the head section 22, and a screw section that engages with the screw section of the head section 22 is formed on the lower end portion of the tension rod 12. Rotating the tension rod 12 in one direction allows the bolt 2 to rotate in the direction in which the fastening target object 4 is fastened. Rotating the tension rod 12 in the other direction allows the bolt 2 to rotate in the direction in which the fastening target object 4 is not fastened.

The motor M1 is used as a power source for rotating the tension rod 12. For example, the tension rod 12 is connected to the motor M1 via a deceleration mechanism, and the power of the motor M1 can be transmitted to the tension rod 12. The controller C controls the operation of driving the motor M1. In place of the motor M1, the tension rod 12 can be rotated by the operator's manual operation.

A stopper 13 is disposed outside the outer circumferential surface of the tension rod 12, and a lower end portion of the stopper 13 is located below the lower end portion of the tension rod 12. The load cell 7 is provided at the upper end portion of the stopper 13. The load cell 7 is used to detect the tensile force P exerted on the bolt 2, and information on the tensile force P detected with the load cell 7 is transmitted to the controller C.

A bearing 14 is disposed between the load cell 7 and the tension rod 12 in the axial direction of the bolt 2. The bearing 14 is disposed not to rotate the load cell 7 and the stopper 13 when the tension rod 12 is rotated as described above. The load cell 7 and the stopper 13 are therefore movable only in the axial direction of the bolt 2.

In the configuration shown in FIG. 9, when the tension rod 12 is rotated with the lower end portion of the stopper 13 being in contact with the upper surface of the fastening target object 4 (first fastening target object 41), the tensile force P can be exerted on the bolt 2. That is, since the tension rod 12 engages with the screw section formed on the outer side surface of the head section 22 of the bolt 2, rotating the tension rod 12 allows the head section 22 of the bolt 2 to be pulled upward. In this process, causing the lower end portion of the stopper 13 to come into contact with the upper surface of the fastening target object 4 allows reaction force required when the head section 22 of the bolt 2 is pulled upward to be ensured. The tensile force P exerted on the bolt 2 is detected with the load cell 7.

The tightening method in the present variation includes a first step, a second step, and a third step, and the tightening method allows tightening force F with which the bolt 2 and the nut 3 are tightened to be equal to tightening force to be targeted (hereinafter referred to as target tightening force) Ftag.

In the first step, the tensile force P is increased to the tensile force Ps (target tightening force Ftag), as described above. At this point, since the lower end portion of the stopper 13 is in contact with the upper surface of the fastening target object 4 (first fastening target object 41), the reaction force against the tensile force P is exerted on the fastening target object 4 via the stopper 13. When the tensile force P reaches the tensile force Ps, the state in which the threads of the screw section 21a are in contact with the threads of the nut 3 is the state shown in the enlarged inset (A) in FIG. 9. In this state, the upper surfaces of the threads of the screw section 21a are in contact with the lower surfaces of the threads of the nut 3, which is opposite the state achieved when the fastening target object 4 is actually fastened with the bolt 2 and the nut 3 (state shown in the enlarged inset (C) in FIG. 9, which will be described later). Backlash corresponding to the distance D in the axial direction of the bolt 2 occurs in the portions where the threads of the screw section 21a are not in contact with the threads of the nut 3.

In the second step, the bit 11 is rotated with the tensile force P maintained equal to the tensile force Ps (target tightening force Ftag) to rotate the bolt 2 in the direction in which the fastening target object 4 is fastened. When the bolt 2 is rotated via the bit 11, the engagement between the head section 22 of the bolt 2 and the tension rod 12 allows the bolt 2 to be moved in the direction in which the fastening target object 4 is fastened.

After the head section 22 of the bolt 2 comes into contact with the upper surface of the fastening target object 4 (first fastening target object 41), the tightening force F increases, and the tensile force P decreases by the amount corresponding to the increase in the tightening force F. The state in which the threads of the screw section 21a are in contact with the threads of the nut 3 transitions to the state shown in the enlarged inset (B) in FIG. 9 and becomes the state shown in the enlarged inset (C) in FIG. 9. In the state shown in the enlarged inset (B) in FIG. 9, the threads of the screw section 21a are separate from the threads of the nut 3 due to the backlash between the bolt 2 and the nut 3 (distance D shown in enlarged inset (A) in FIG. 9). In the state shown in the enlarged inset (C) in FIG. 9, the lower surfaces of the threads of the screw section 21a are in contact with the upper surfaces of the threads of the nut 3, which is the state achieved when the fastening target object 4 is actually fastened with the bolt 2 and the nut 3.

In the second step, when the tightening force F increases, and the tensile force P decreases as the tightening force F increases, an inflection point occurs in the behavior (time course change) of the change rate $dP/d\theta$. After the timing when the inflection point occurs, the rotation of the bolt 2 is stopped.

In the third step, the tensile force P exerted on the bolt 2 by the tension rod 12 and the stopper 13 is removed. The bit 11 and the tension rod 12 are removed from the head section 22 of the bolt 2. The tightening force F can thus be equal to the target tightening force Ftag.

Figure 10:
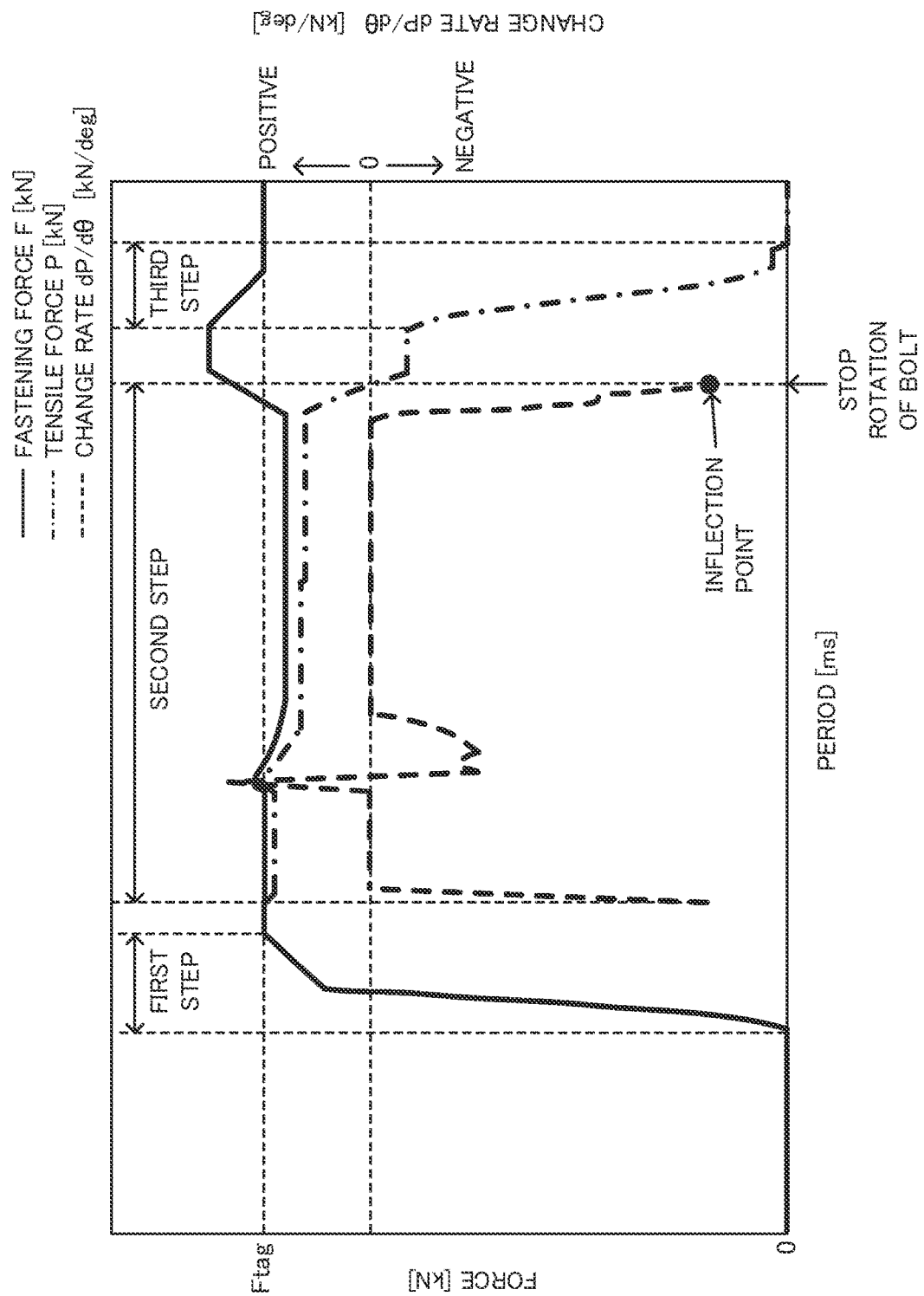
FIG. 10 shows time course changes in the tightening force and tensile force and a time course change in the change rate dP/dθ in a variation.

FIG. 10 shows time course changes in the tightening force F and the tensile force P and a time course change in the change rate $dP/d\theta$ in the variation. In FIG. 10, the horizontal axis represents the period [ms] for which the first step, the second step, and the third step described above are carried out. The time frame excluding the period for which the first step, the second step, and the third step are carried out is a no-action time frame. The left vertical axis in FIG. 10 represents the force (tightening force F or tensile force P) [kN], and the right vertical axis in FIG. 10 represents the change rate $dP/d\theta$ [kN/deg]. The behavior of the change rate $dP/d\theta$ is shown only in the second step for convenience of the computation of the change rate $dP/d\theta$.

The tightening force F shown in FIG. 10 shows values detected with a load cell (not shown) incorporated in the fastening target object 4. When the bolt 2 and the nut 3 are actually fastened to the fastening target object 4, no load cell is provided, and the tightening force F is not measured. The tensile force P shows values detected with the load cell 7, and the change rate $dP/d\theta$ shows values calculated based on the tensile force P and the angle of rotation $\theta$ detected with the rotational angle sensor RS.

In the first step, the tensile force P increases to the tensile force Ps (target tightening force Ftag), and the tightening force F increases to the target tightening force Ftag, as shown in FIG. 10. The tightening force F at this point is the force exerted from the stopper 13 on the fastening target object 4.

In the second step, the nut 3 is rotated and tightened by the bit 11 with the tensile force P maintained at the tensile force Ps (target tightening force Ftag). The tightening force F increases as the tightening resulting from the rotation of the nut 3 proceeds, and the tensile force P decreases by the amount corresponding to the increase in the tightening force F. The tightening force F at this point is the force exerted from the head section 22 of the bolt 2 on the fastening target object 4. The elastic deformation of the threads of the bolt 2 and the threads of the nut 3 lowers the tensile force P. As for the behavior of the change rate $dP/d\theta$, the change rate $dP/d\theta$ has a negative value, and an inflection point occurs. When it is determined that the inflection point has occurred, the rotation of the bolt 2 is stopped so that the second step is terminated, as described above.

In the third step, the tensile force P exerted on the bolt 2 is removed. The tensile force P therefore decreases to 0 [kN]. When the tensile force P exerted on the bolt 2 is removed, the elastically deformed threads of the bolt 2 and the nut 3 are restored, and the tightening force F decreases accordingly and then becomes equal to the target tightening force Ftag.

Figure 11:
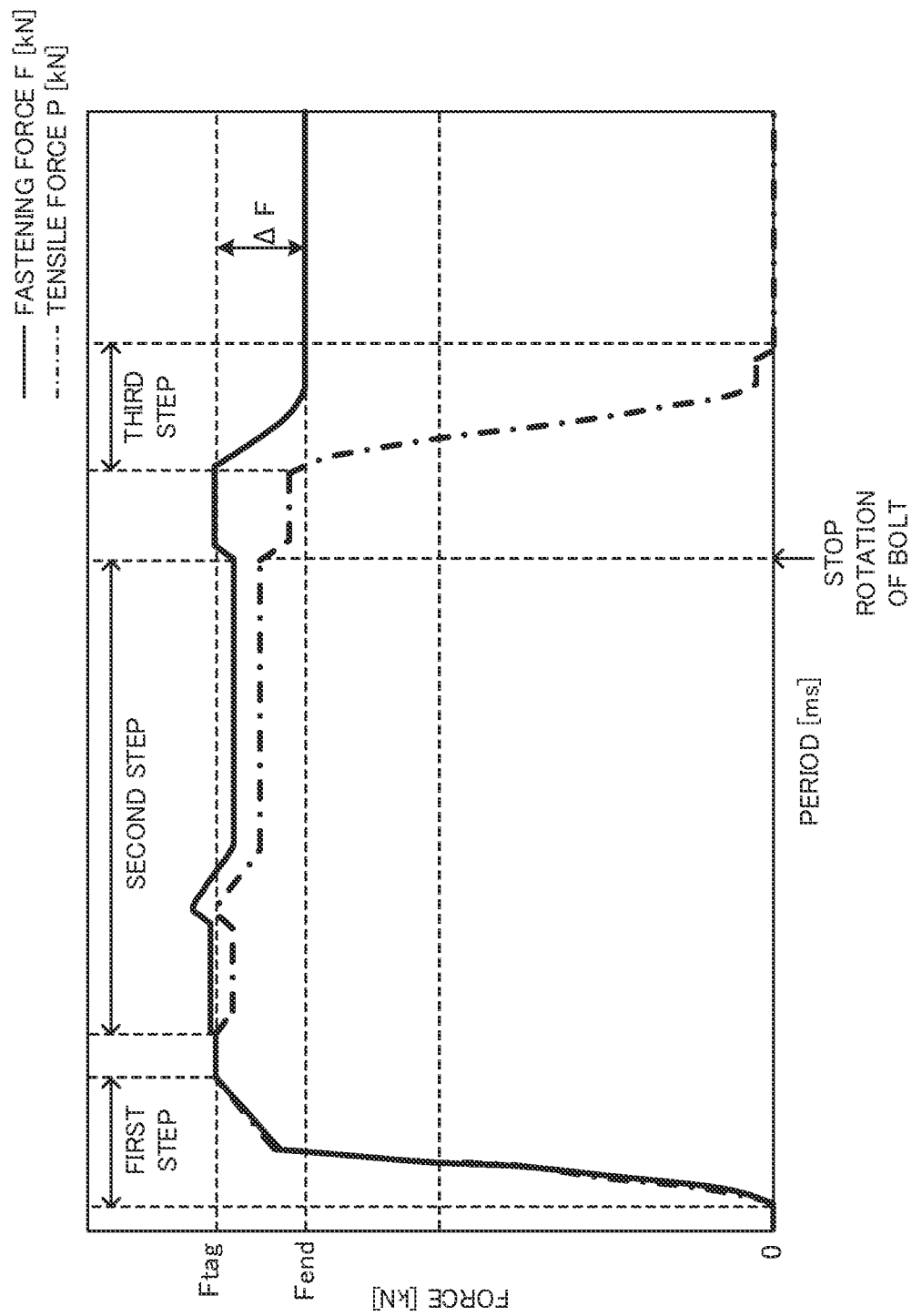
FIG. 11 shows time course changes in the tightening force and the tensile force in related art.

On the other hand, FIG. 11 shows the time course changes in the tightening force F and the tensile force P in a case where a fastening method different from the method according to the present invention is performed on the screw fastener 1 shown in FIG. 9. In FIG. 11, the horizontal axis represents the period [ms] for which the first step, the second step, and the third step described above are carried out. The time frame excluding the period for which the first step, the second step, and the third step are carried out is a no-action time frame. The vertical axis in FIG. 11 represents the force (tightening force F or tensile force P) [kN]. The tightening force F shown in FIG. 11 shows values detected with a load cell (not shown) incorporated in the fastening target object 4. The tensile force P shows values detected with the load cell 7.

According to the tightening method shown in FIG. 11, at the timing when the state in which the tightening force F is equal to the tensile force P changes to the state in which the tightening force F differs from the tensile force P, in other words, at the timing when the tensile force P decreases after the head section 22 of the bolt 2 comes into contact with the upper surface of the fastening target object 4, the rotation of the bolt 2 is stopped. When the rotation of the bolt 2 is stopped as described above, tightening force Fend after the tensile force P exerted on the bolt 2 is removed becomes smaller than the target tightening force Ftag in the third step. That is, the elastically deformed threads of the bolt 2 and the nut 3 are restored, so that the tightening force Fend becomes smaller than the target tightening force Ftag by the amount corresponding to the difference $\Delta F$ shown in FIG. 11.

As described above, even in the configuration shown in FIG. 9, the tightening force F can be equal to the target tightening force Ftag by stopping the rotation of the bolt 2 to remove the tensile force P after the timing when an inflection point occurs in the behavior of the change rate $dP/d\theta$, as described in the present embodiment.

The invention claimed is:

1. A method for tightening a bolt and a nut that fasten a fastening target object, the method comprising:
    exerting tightening force on the fastening target object by rotating the nut or the bolt in a state in which predetermined tensile force in an axial direction of the bolt is exerted on the bolt; and
    terminating the tightening resulting from the rotation of the nut or the bolt and removing the tensile force exerted on the bolt when the tensile force exerted on the bolt decreases as the tightening force increases and after a timing when an inflection point occurs in a time course change in a ratio of an amount of change in the tensile force exerted on the bolt to an amount of change in an angle of rotation of the nut or the bolt.

2. The method according to claim 1, wherein the tightening resulting from the rotation of the nut or the bolt is terminated and the tensile force exerted on the bolt is removed when the ratio is substantially fixed in the time course change in the ratio.

3. The method according to claim 2, wherein the predetermined tensile force is equal to a target tightening force used to fasten the fastening target object.

4. The method according to claim 1, wherein the predetermined tensile force is equal to a target tightening force used to fasten the fastening target object.

5. A tightening device that fastens a bolt and a nut to a fastening target object, the tightening device comprising:
- a first sensor configured to detect tensile force exerted on the bolt in an axial direction thereof;
- a second sensor configured to detect an angle of rotation of the nut or the bolt; and
- a controller configured to control the tightening resulting from the bolt and the nut, wherein the controller,
when tightening force is exerted on the fastening target object by rotating the nut or the bolt in a state in which predetermined tensile force is exerted on the bolt, terminates the tightening resulting from the rotation of the nut or the bolt when the tensile force exerted on the bolt decreases as the tightening force increases and after a timing when an inflection point occurs in a time course change in a ratio of an amount of change in the tensile force exerted on the bolt to an amount of change in an angle of rotation of the nut or the bolt.

6. The tightening device according to claim 5, wherein the controller terminates the tightening resulting from the rotation of the nut or the bolt when the ratio is substantially fixed in the time course change in the ratio.

7. The tightening device according to claim 6, wherein the predetermined tensile force is equal to a target tightening force used to fasten the fastening target object.

8. The tightening device according to claim 5, wherein the predetermined tensile force is equal to a target tightening force used to fasten the fastening target object.

* * * * *